(12) United States Patent
Aron (10) Patent No.: US 9,616,956 B2
(45) Date of Patent: Apr. 11, 2017

(54) QUICK RELEASE MECHANISM WITH SAFETY COLLAR APPARATUS

(71) Applicant: Mathew R Aron, San Diego, CA (US)

(72) Inventor: Mathew R Aron, San Diego, CA (US)

( * ) Notice: Subject to any disclaimer, the term of this patent is extended or adjusted under 35 U.S.C. 154(b) by 170 days.

(21) Appl. No.: 14/544,859

(22) Filed: Feb. 26, 2015

(65) Prior Publication Data
US 2016/0251047 A1    Sep. 1, 2016

(51) Int. Cl.
B62J 9/00    (2006.01)

(52) U.S. Cl.
CPC .......... B62J 9/001 (2013.01); *B62K 2206/00* (2013.01)

(58) Field of Classification Search
CPC ..... B62J 9/001; B62J 9/00; B62J 11/00; B62J 7/04; Y10T 403/7039; Y10T 24/4501; Y10T 24/45052; A45F 2005/026
USPC .......................... 224/428–431; 403/376, 354
See application file for complete search history.

(56) References Cited

U.S. PATENT DOCUMENTS

| | | |
|---|---|---|
| 2,553,739 A | 5/1951 | Ashdowne |
| 2,577,560 A | 12/1951 | Ashdowne |
| 2,783,927 A | 3/1957 | Harley |
| 3,346,156 A | 10/1967 | Jones |
| 3,390,897 A | 7/1968 | Moore |
| 4,096,980 A | 6/1978 | Clow |
| 4,163,513 A | 8/1979 | Kramer |
| 4,274,181 A | 6/1981 | Schaller |
| 4,295,586 A | 10/1981 | Shockley |
| 4,588,879 A * | 5/1986 | Noda ................. H01H 33/6644 218/127 |
| 5,176,465 A | 1/1993 | Holsted |
| 5,379,912 A | 1/1995 | Wolf |
| 5,762,249 A | 6/1998 | Hann |
| 6,053,384 A | 4/2000 | Bachman |
| 6,293,450 B1 * | 9/2001 | Aron ........................ B62J 9/001 224/413 |
| 6,363,678 B1 * | 4/2002 | Shuler .................... E04H 15/44 403/340 |

* cited by examiner

*Primary Examiner* — Adam Waggenspack (57) ABSTRACT

A quick release mechanism with safety collar is provided. The quick release mechanism includes a mounting element having an axis extending along a threaded shank, a male element located at a distal end of the threaded shank, and a bolt head located between the threaded shank and the male element. A receiving element having an axis extending along a second threaded shank and a coupling portion located at a distal end of the second threaded shank, the coupling portion including a slot sized to receive the male element and a raised channel adjacent to the slot, the raised channel having an elevated shoulder that abuts an end of the slot.

10 Claims, 8 Drawing Sheets

QUICK RELEASE MECHANISM WITH SAFETY COLLAR APPARATUS

FIELD OF THE INVENTION

The present invention generally relates to vehicle motorcycle accessories. More particularly, the invention concerns a mechanism for mounting a saddlebag to a motorcycle.

BACKGROUND OF THE INVENTION

The popularity of motorcycling continues to increase. Riders are attracted to the freedom of the open road, leaving behind the cares and worries of everyday life. Motorcycle manufacturers have seized upon the recent surge in popularity and have been selling motorcycles and accessories in record numbers.

Obviously, motorcycles cannot carry as many items as motor vehicles. In order to provide as much carrying capacity as possible, saddlebags are attached to the motorcycle. A motorcycle may have saddlebags for carrying the rider's personal gear, repair tools or other items. One saddlebag is typically mounted to a bracket attached to the frame rearward of the rider's seat on each side of the motorcycle. Although many saddlebags are made of leather, others are made of fiberglass or a similar rigid material.

Saddlebags generally must be removed to perform any significant maintenance on the motorcycle. Removing a saddlebag may be inconvenient and time consuming because the saddlebag is often bolted to the mounting bracket, which in turn is bolted to the frame of the motorcycle. For example, to remove each saddlebag from the HARLEY-DAVIDSON HERITAGE motorcycle, one must unscrew four bolts to detach the saddlebag from the mounting bracket and unscrew three bolts to detach the mounting bracket from the frame. Obviously, this is time consuming and very inconvenient.

Therefore, there exists a need for an apparatus that enables the quick and easy mounting and removal of motorcycle saddlebags.

BRIEF DESCRIPTION OF THE DRAWINGS

Various embodiments of the present invention taught herein are illustrated by way of example, and not by way of limitation, in the figures of the accompanying drawings, in which.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

Features and advantages of the present invention will be appreciated from review of the following detailed description of the invention, along with the accompanying figures in which like reference numerals are used to describe the same, similar or corresponding parts in the several views of the drawings.

DETAILED DESCRIPTION OF EMBODIMENTS OF THE INVENTION

In the following description, for the purposes of explanation, numerous specific details are set forth in order to provide a thorough understanding of the quick-release mechanism with safety collar (hereafter "QRMS") that embodies principals of the present invention. It will be apparent, however, to one skilled in the art that the QRMS may be practiced without some of these specific details. Throughout this description, the embodiments and examples shown should be considered as exemplars, rather than as limitations on the QRMS. That is, the following description provides examples, and the accompanying drawings show various examples for the purposes of illustration. However, these examples should not be construed in a limiting sense as they are merely intended to provide examples of the QRMS rather than to provide an exhaustive list of all possible implementations of the QRMS.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention relates to a quick-release mounting system having a safety collar for a motorcycle saddlebag and a method for retrofitting a motorcycle with the system. The system includes two or more coupling assemblies with which one can retrofit a motorcycle by replacing bolts of the original mounting system with the coupling assemblies. Each coupling assembly comprises a first coupling portion and a second coupling portion that can be removably coupled and uncoupled to one another in a quick-release manner. In addition, each coupling assembly includes a safety collar that prevents an unintentional, or accidental uncoupling of the coupling assembly.

Figure 1:
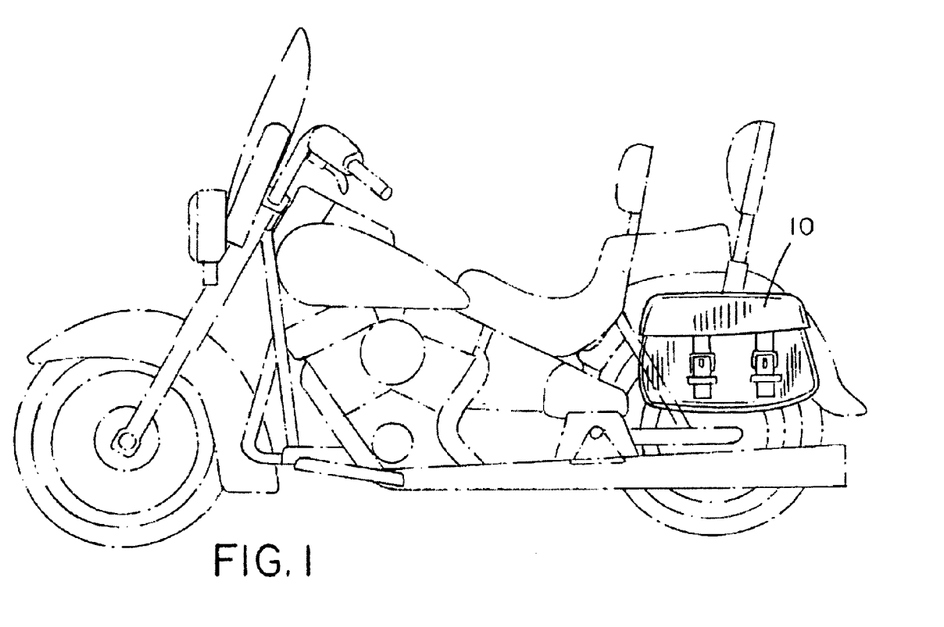
FIG. 1 is a side view showing a saddlebag mounted on a motorcycle, which is shown in broken line.
Figure 2:
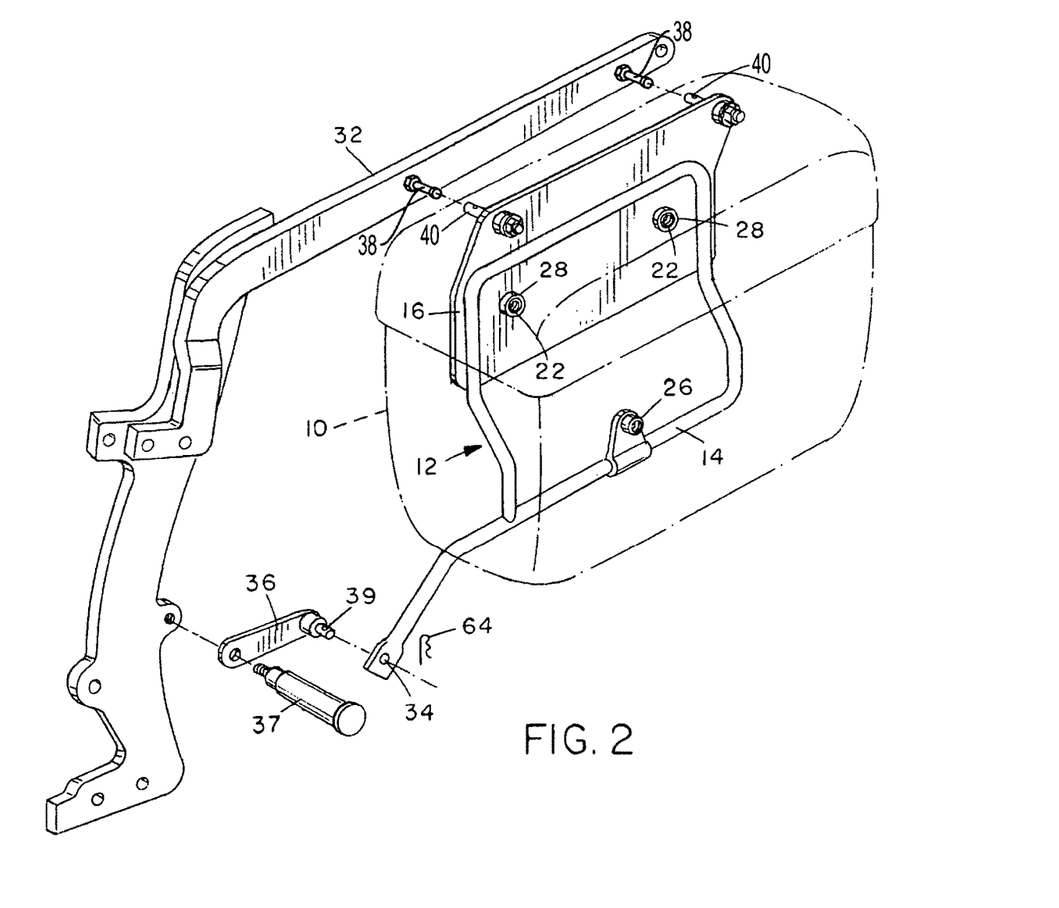
FIG. 2 is an exploded view of a saddlebag assembly, showing the mounting mechanisms of the present invention.
Figure 3:
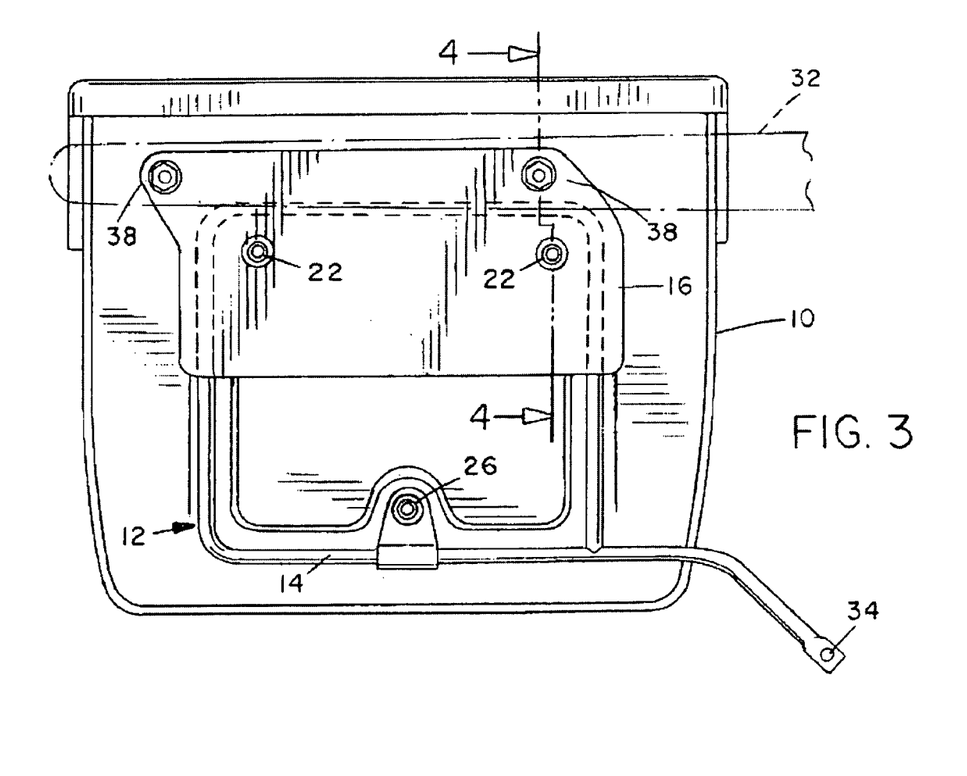
FIG. 3 is a rear view of the saddlebag assembly.
Figure 4:
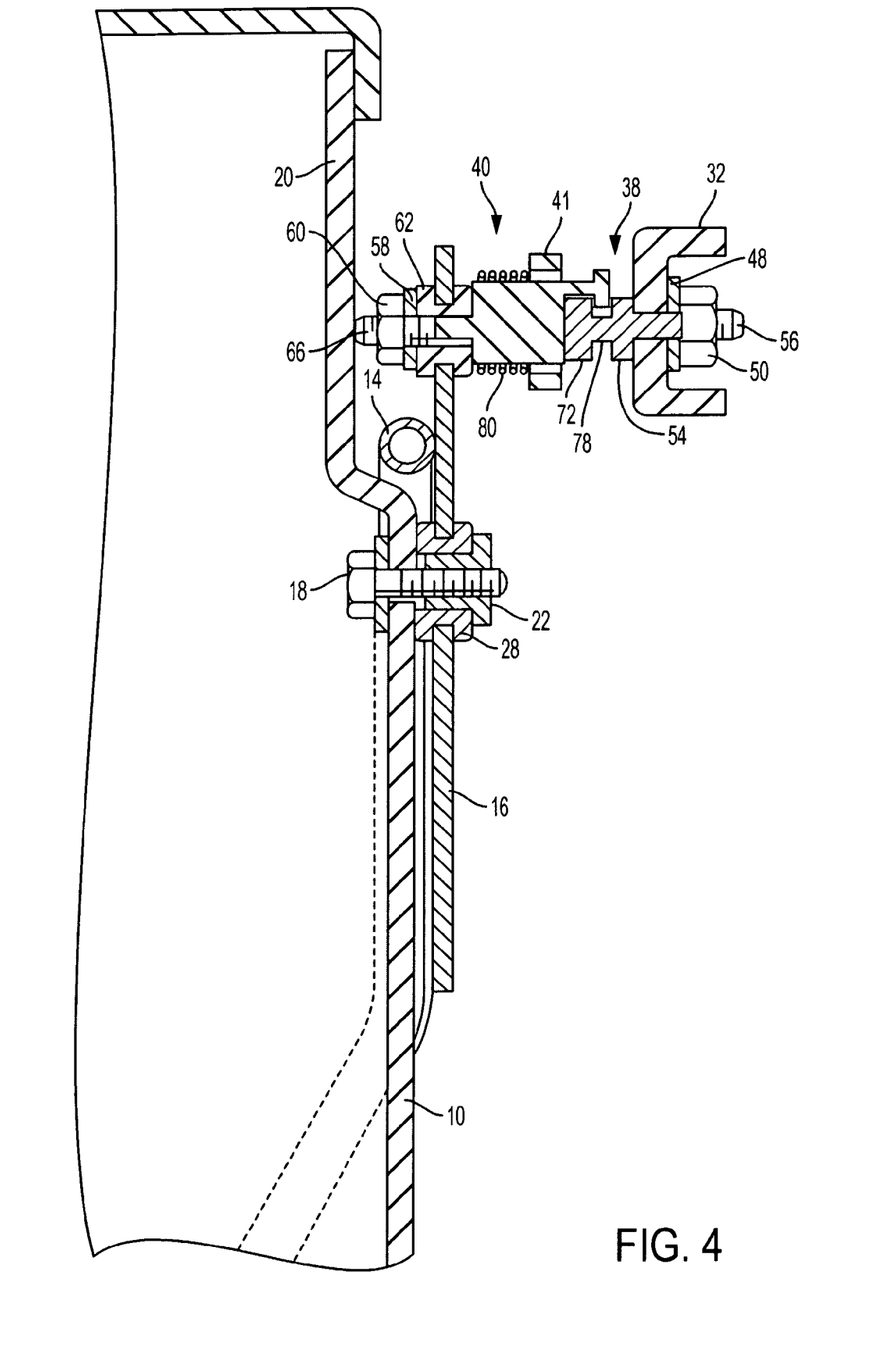
FIG. 4 is an enlarged sectional view taken on line 4-4 of FIG. 3.
Figure 5:
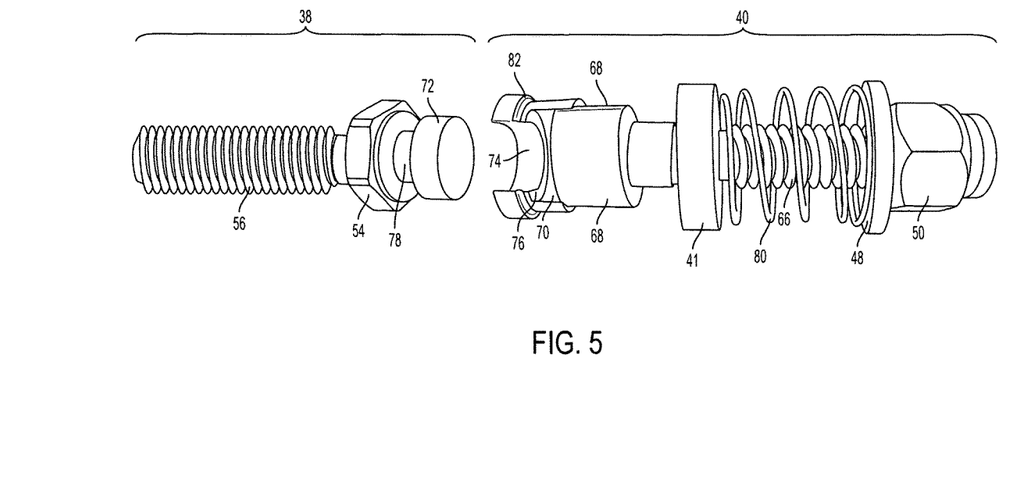
FIG. 5 is a close-up view of the mounting mechanisms shown in FIGS. 2 and 4.

Referring now to FIGS. 1-2, a saddlebag assembly 10 is mounted on a motorcycle (shown in phantom line). As illustrated in FIG. 2, saddlebag assembly 10 includes a saddlebag (shown in phantom line) and a mounting bracket 12. A portion 14 of mounting bracket 12 is tubular and a portion 16 is plate-like. As shown in FIGS. 4 and 5, the saddlebag is attached to mounting bracket 12 by two bolts 18 that extend through holes in the inboard side of the saddlebag wall 20 and are received in two threaded studs 22 in plate-like portion 16 and by one bolt 24 that extends through another hole in the inboard side of saddlebag wall 20 and is received in the threaded stud 26 on tubular portion 14. Grommets 28 in these holes damp any vibration. Saddlebag assembly 10 is attached, more or less permanently, to a fender brace portion of the frame 32 of the motorcycle by two bolts (not shown) that extend through a pair of holes in plate-like portion 16 and frame 32 and by a third bolt (not shown) that extends through a hole 34 in tubular portion 14. Specifically, the former two bolts are screwed into internally threaded studs (not shown), which have threaded shanks that are in turn secured to the fender brace portion of frame 32 by nuts (not shown) in the conventional manner. The latter or third bolt extends not only through hole 34 but also through a hole in bracket extension 36 and is secured to by a nut. Bracket extension 36 is in turn bolted to frame 32, typically by a foot peg 37. The above-described structure is well-known in the art, as it exists on the Harley-Davidson Heritage motorcycle, as well as other Harley-Davidson motorcycles (Harley-Davidson is a registered trademark of H-D Michigan, Inc., of Ann Arbor Mich.). Prior to retrofitting the motorcycle in accordance with the present invention, the only way to remove saddlebag assembly 10 is to remove the three bolts that secure it to frame 32.

To retrofit the motorcycle in accordance with the present invention, one removes the bolts, studs, and nuts that, as described above, secure saddlebag assembly 10 to frame 32. As illustrated in FIG. 2, two or more of the bolts and their corresponding studs or nuts are each replaced with the quick-release mechanism with safety collar (hereafter "QRMS") of the present invention. For example, in place of each of the two bolts that formerly secured plate-like portion 16 of bracket 12, a receiving element 40 is attached to plate-like portion 16. In place of each of the two studs that were formerly secured to fender brace portion of frame 32, a mounting element 38 is attached. In place of the third bolt, which was formerly attached to bracket extension 36 and secured tubular portion 14 to bracket extension 36, a coupling member 39 is attached to bracket extension 36. Each mounting element 38 is removably mateable in a quick-release manner with each female receiving element 40. Once mounted, the quick-release collar 41 is positioned over portions of both the mounting and receiving elements 38, 40 thereby preventing the inadvertent separation of the two elements, 38 and 40.

Figure 6:
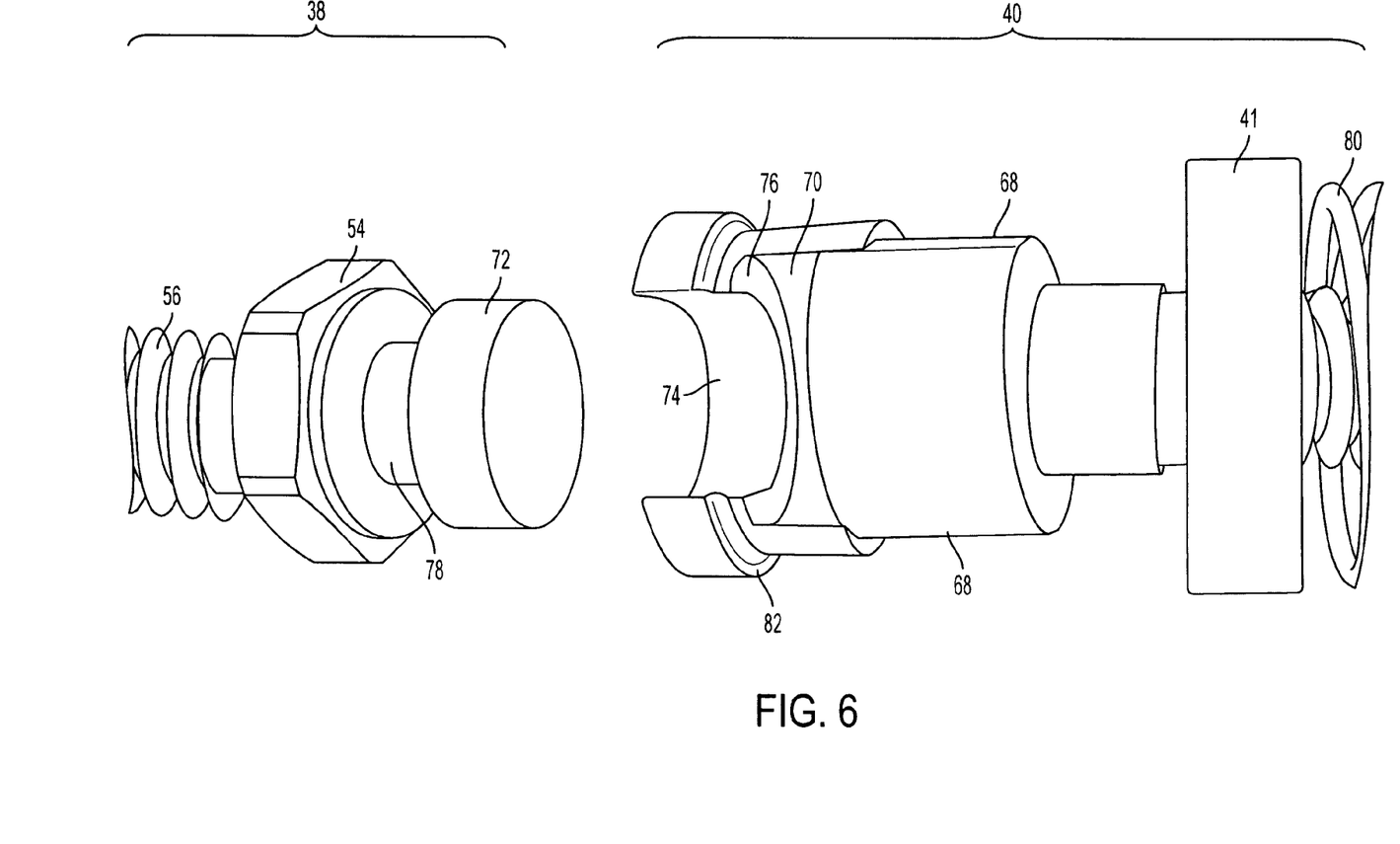
FIG. 6 is a close-up view of the mounting mechanisms shown in FIG. 5.

The structure of each coupling element and the manner in which it is attached is illustrated in further detail in FIGS. 4-6. Each female receiving element 40 includes a threaded shank 66 that terminates in a coupling portion that includes two wrench flats 68 and a semi-cylindrical slot 70 sized to receive a cylindrical head, or male element 72 on the mounting element 38. A semi-cylindrical raised channel 74 is located adjacent to the slot 70, the raised channel 74 having an elevated shoulder 76 that abuts an end of the slot 70. The elevated shoulder 76 is formed, in part, because the diameter of the slot 70 is greater than the diameter of the raised channel 74. As shown in FIG. 4, threaded shank 66 extends through one of the holes in the plate-like portion 16 of bracket 12 and is secured by a washer 58 and a nut 60. The original elastomeric grommet 62 remains in the hole to damp vibration.

Referring again to FIGS. 4-6, the mounting element 38 includes a threaded shank 56, a cylindrical male element 72 located at a distal end, and a bolt head 54 located between the threaded shank 56 and the male element 72. A locking cylinder, or cylindrical element 78 is located between the male element 72 and the bolt head 54. The locking cylinder 78 has a diameter that is smaller than the diameter of the male element 72. As shown in FIG. 4, threaded shank 56 extends through one of the holes in the fender brace portion of frame 32 and is secured by a washer 48 and a nut 50. Coupling member 39, shown in FIG. 2, which attaches tubular portion 14 to bracket extension 36, has a similar structure and is mounted in essentially the same manner. That is, it has a threaded shank (not shown) that extends through the hole in bracket extension 36 and is secured by another washer 48 and nut 50 (not shown in FIG. 2). It further has an enlarged cylindrical elastomeric bushing that abuts bracket extension 36 to damp vibration.

Figure 7:
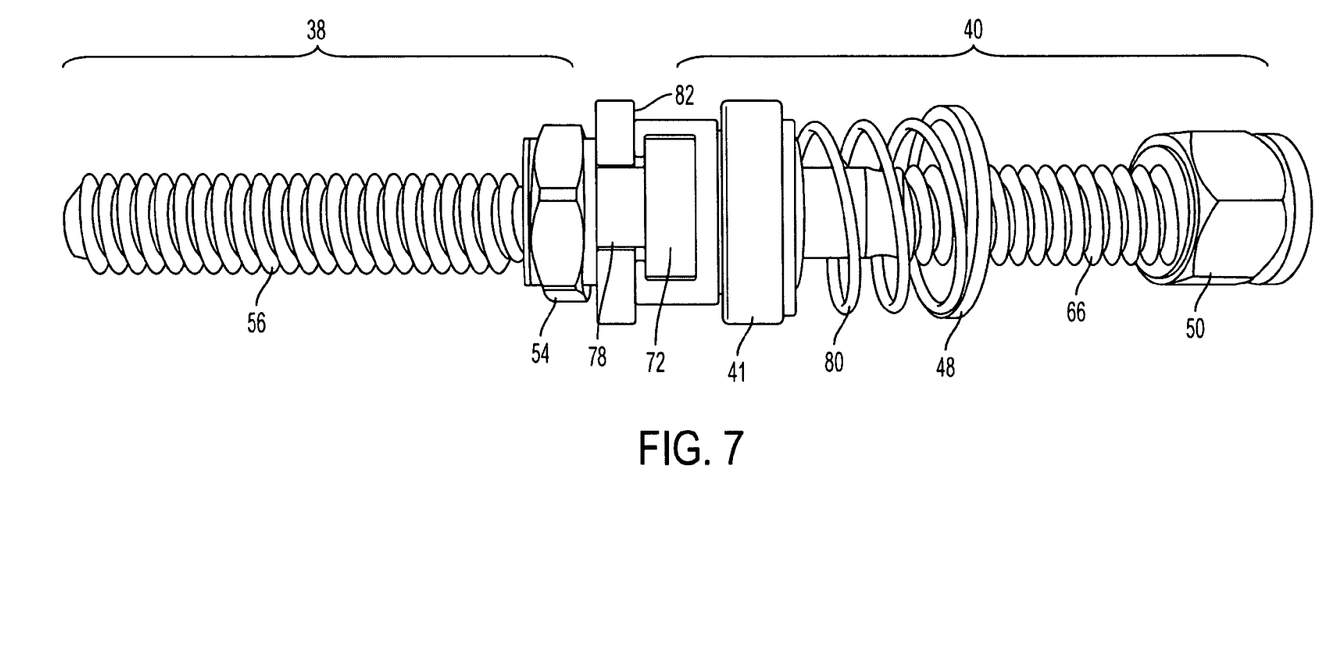
FIG. 7 is a close-up view of the mounting mechanisms shown in FIGS. 5 and 6, with the two mechanisms removeably coupled together and a safety collar located in the unlocking position.
Figure 8:
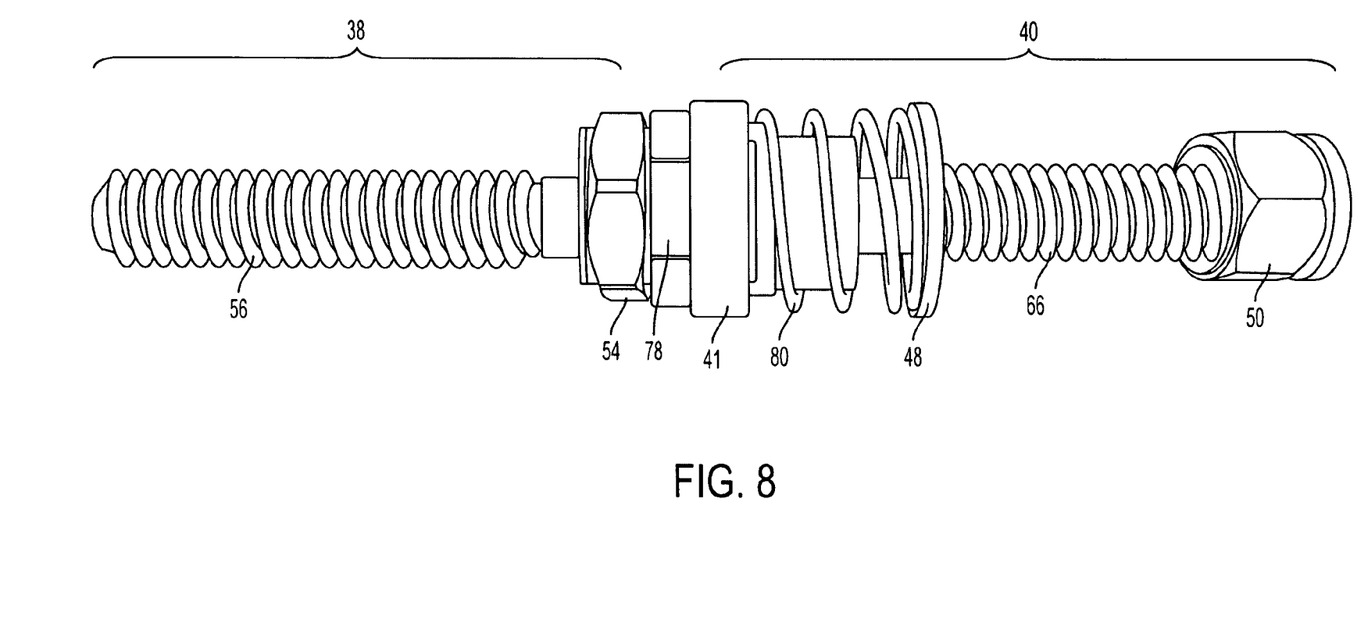
FIG. 8 is a close-up view of the mounting mechanisms shown in FIG. 7, with the two mechanisms removeably coupled together, and a safety collar located in the locking position.

Referring now to FIGS. 7-8, the mounting and receiving elements, 38 and 40, removeably attached together are illustrated. The male element 72 is placed in slot 70, and simultaneously, as a result of the arrangement of elements, the locking cylinder 78 is located in raised channel 74. The male element 72 is now securely engaged, as the head of the male element 72 contacts the solid face of the receiving element 40 adjacent to the wrench flats 68. The other end of the male element 72, which comprises a cylindrical flange, contacts the semi-cylindrical elevated shoulder 76. With both ends of the male element 72 securely captured, any significant relative movement between the mounting and receiving elements, 38 and 40, is eliminated.

In addition, the quick-release safety collar 41 can be placed over the male element 72, thereby preventing inadvertent disengagement of the male element 72 from the slot 70. Spring 80 abuts the safety collar 41, as shown in FIGS. 7-8, so that one end of the safety collar 41 is forced against semi-cylindrical flange 82, shown in FIGS. 5-6. The flange 82 is located at the distal end of the receiving element 40, comprises a semi-cylindrical shape, and is formed by the distal end of the receiving element 40 having a diameter larger than the diameter of the adjacent portion of the receiving element 40. FIG. 7 shows the safety collar 41 in a retracted position, and FIG. 8 shows the safety collar 41 in the engaged position, covering the male element 72 and slot 70. Although the embodiment described above discusses the shapes of the mating parts as cylindrical, in other embodiments the mating parts may have other suitable shapes.

To mount saddlebag assembly 10 on the motorcycle using the mounting and receiving elements 38 and 40, one orients saddlebag assembly 10 such that the male element 72 is laterally adjacent to slot 70. Preferably, the receiving element 40 containing the slot 70 is mounted on the saddlebag (as described above) in an orientation in which slot 70 faces downward with respect to the ground. With that orientation, one can mount saddlebag assembly 10 by lowering it until the male element 72 is fully received in slot 70. As this procedure occurs, the safety collar 41 is pulled back into the position shown in FIG. 7. Then once the male element 72 is fully received in slot 70, the safety collar 41 is released, whereby spring 80 pushes the safety collar 41 against flange 82, so that the male element 72 and slot 70 are covered by the safety collar 41, which prevents disengagement of the male element 72 from the slot 70. Finally, with reference to FIG. 2, a plug portion of coupling member 39 is inserted through hole 34 in tubular portion 14 of bracket 12 and is secured by cotter pin 64. Other motorcycle saddlebags 10 may not require the third connection using the cotter pin 64.

To remove the saddlebag assembly 10 from the motorcycle, one can quickly and easily retract the safety collar 41, and lift upwards on the saddlebag, thereby disengaging the male element 72 from the slot 70.

The present invention allows one to quickly and easily mount and dismount a motorcycle saddlebag without the use of tools and without reaching into the saddlebag. A motorcycle such as the Harley-Davidson Heritage can be retrofitted by replacing the original bolt system with the quick-release coupling system of the present invention. Although the present invention is particularly suitable for such retrofitting, it can alternatively be included as original equipment on a motorcycle. Harley-Davidson manufactures many different models of motorcycles, which may be generally categorized into five different types: Touring models, Softail models, Sportster models, Dyna Glide models, and V-Rod models (Harley-Davidson is a registered trademark of H-D Michigan, Inc., of Ann Arbor Mich.).

For example, touring models may include the FLHT Electra Glide standard, FLHTC Electra Glide classic, FLHTCU Ultra Classic Electra Glide, FLHTP Electra Glide police, FLHS Electra Glide sport, FLHR Road King, FLHRC Road King classic, FLHP Road King police, FLTC Tour Glide classic, FLTCU Ultra classic tour Glide, FLTR Road Glide, FLHRS Road King custom, FLHRI Road King, FLHRSI Road King custom, FLHRCI Road King classic, FLTRI Road Glide, FLHTI Electra Glide standard, FLHTCI Electra Glide classic, and the FLHTCUI Ultra Classic Electra Glide (some or all of the above model names may be registered trademarks of H-D Michigan, Inc., of Ann Arbor Mich.).

Sportster models may include the Sportster XL883, Sportster XL883L, Sportster XL883C, Sportster XL883C custom, Sportster XL883R, Sportster XLH883, Sportster XLH883 Hugger, Sportster XLH883 Deluxe, Sportster XL1200C, Sportster XL1200C custom, Sportster XL1200R, Sportster XL1200R Roadster, Sportster XLH1200, and the Sportster 1200S Sport (some or all of the above model names may be registered trademarks of H-D Michigan, Inc., of Ann Arbor Mich.).

Dyna Glide models may include the FXD Dyna Super Glide, FXDX Dyna Super Glide sport, FXDXT Dyna Super Glide T-sport, FXDL Dyna Low Rider, FXDP Dyna Defender, FXDS-CONV Dyna Convertible, FXDWG Dyna Wide Glide, FXDC/I Super Glide Custom, FXDI Dyna Super Glide, FXDXI Dyna Super Glide sport, FXDCI Super Glide custom, FXDLI Dyna Low Rider, and the FXDWGI Dyna Wide Glide (some or all of the above model names may be registered trademarks of H-D Michigan, Inc., of Ann Arbor Mich.).

V-Rod models may include the VRSCA V-Rod, VRSCB V-Rod, and the VRSCR Street Rod (some or all of the above model names may be registered trademarks of H-D Michigan, Inc., of Ann Arbor Mich.).

Softail models may include the FXST Softail Standard, FXSTI Softail Standard, FXSTB Night Train, FXSTBI Night Train, FXSTSI Springer Softail, FXSTDI Deuce, FLSTF Fat Boy, FLSTFI Fat Boy, FLSTFI Fat Boy 15$^{th}$ Anniversary Special Edition, FLSTNI Softail Deluxe, FLSTSCI Softail Springer Classic, FLSTC Heritage Softail Classic, FLSTCI Heritage Softail Classic, FLSTN Heritage Softail Special, FLSTS Heritage Springer, FXSTC Softail Custom, FXSTD Softail Deuce, FXSTS Springer Softail, and the FXSTSB Bad Boy (some or all of the above model names may be registered trademarks of H-D Michigan, Inc., of Ann Arbor Mich.).

Clearly, Harley-Davidson manufactures many different motorcycle models. It will be appreciated that the present invention may be installed on any of the above-listed models, or on other models yet to be manufactured. In addition, the present invention may be installed on a "custom" motorcycle, which is a motorcycle that differs from a manufacturer-produced model. For example, a custom motorcycle may be a Harley-Davidson FXST Softail Standard that has had specific parts either added, removed or modified. Or, a custom motorcycle may be built from scratch, using no, or very few pre-manufactured parts, such as only the engine, transmission and tires. In addition, motorcycles are built by manufacturers such as Aprilla, BMW, Buell, Ducati, Honda, Indian, Kawasaki, Moto Guzzi, Suzuki, Triumph, Victory, Yamaha, and others. It will be appreciated that the present invention may be installed on any motorcycle built by the above-listed manufacturers, or other un-named manufacturers (some, or all of the above-listed manufacturer names may be registered trademarks of their respective owners).

It is to be noticed that the term "comprising", used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the claims, should not be interpreted as being limitative to direct connections only.

Thus, it is seen a quick-release mechanism with safety collar apparatus is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

The invention claimed is:

1. An apparatus for a motorcycle, comprising:
   a mounting element comprising an axis extending along a threaded shank, a male element located at a distal end of the threaded shank, and a bolt head located between the threaded shank and the male element; and
   a receiving element comprising an axis extending along a threaded shank and a coupling portion located at a distal end of the threaded shank, the coupling portion comprising:
      a slot sized to receive the male element; and a raised channel adjacent to the slot, the raised channel having an elevated shoulder that abuts an end of the slot;

where the coupling portion further comprises an elongated cylinder, with the slot and raised channel positioned in, and forming an opening in, the elongated cylinder, the elongated cylinder further comprising:

a distal end portion having a diameter greater than a remaining portion of the elongated cylinder, thereby forming a raised flange extending around an outer surface of the elongated cylinder, the raised flange terminating at the opening of the raised channel; and further comprising a cylindrical collar moveably positionable around the receiving element, the cylindrical collar having an inner diameter smaller than the diameter of the distal end portion, so that when the cylindrical collar is moved to the distal end portion of the elongated cylinder it abuts the raised flange so that a portion of the cylindrical collar substantially covers the slot.

2. The apparatus of claim 1, where the male element comprises:

a first cylinder having a first diameter; and a second cylinder having a second diameter, the second diameter smaller than the first diameter, with the second cylinder located between the first cylinder and the bolt head.

3. The apparatus of claim 1, where a radius of the raised channel is smaller than a radius of the slot.

4. The apparatus of claim 1, where the coupling portion further comprises a pair of wrench flats located on the outer surface of the elongated cylinder.

5. The apparatus of claim 1, further comprising a helical spring moveably positionable about the receiving element, the helical spring positionable against a cylindrical collar that is also moveably positionable about the receiving element, so that the helical spring keeps the cylindrical collar positioned substantially over the slot.

6. A quick release apparatus for a motorcycle, comprising:

a discrete receiving element comprising an axis extending along a threaded shank;

a coupling portion located at a distal end of the threaded shank, the coupling portion comprising:

a slot; and a raised channel adjacent to the slot, the raised channel having an elevated shoulder that abuts an end of the slot;

a discrete mounting element comprising an axis extending along a threaded shank;

a male element located at a distal end of the threaded shank, and a bolt head located between the threaded shank and the male element; and a cylindrical collar moveably positionable around the receiving element, the cylindrical collar positionable over the male element and the slot;

where the coupling portion further comprises an elongated cylinder, with the slot and raised channel positioned in, and forming an opening in, the elongated cylinder, the elongated cylinder further comprising:

a distal end portion having a diameter greater than a remaining portion of the elongated cylinder, thereby forming a raised flange extending around an outer surface of the elongated cylinder, the raised flange terminating at the opening of the raised channel; and wherein the cylindrical collar is moveably positionable around the receiving element, the cylindrical collar having an inner diameter smaller than the diameter of the distal end portion, so that when the cylindrical collar is moved to the distal end portion of the elongated cylinder it abuts the raised flange so that a portion of the cylindrical collar substantially covers the slot.

7. The quick release apparatus of claim 6, where the male element comprises:

a first cylinder having a first diameter; and a second cylinder having a second diameter, the second diameter smaller than the first diameter, with the second cylinder located between the first cylinder and the bolt head.

8. The quick release apparatus of claim 6, where a radius of the raised channel is smaller than a radius of the slot.

9. The quick release apparatus of claim 6, where the coupling portion further comprises a pair of wrench flats located on the outer surface of the elongated cylinder.

10. The quick release apparatus of claim 6, further comprising a helical spring moveably positionable about the receiving element, the helical spring positionable against the cylindrical collar that is also moveably positionable about the receiving element, so that the helical spring keeps the cylindrical collar positioned substantially over the slot.

* * * * *